United States Patent [19]

Kitagawa

[11] 4,163,623
[45] Aug. 7, 1979

[54] MULTIPLE SPINDLE DRILLING MACHINE FOR WIDE FLANGE BEAMS

[75] Inventor: Toshikatsu Kitagawa, Seki, Japan

[73] Assignee: Miyakawa Industry Company, Limited, Seki, Japan

[21] Appl. No.: 852,005

[22] Filed: Nov. 16, 1977

[51] Int. Cl.² ............................................ B23B 39/20
[52] U.S. Cl. ...................................... 408/46; 408/53; 408/90
[58] Field of Search ....................... 408/42, 46, 50, 52, 408/53, 89, 90, 117

[56] References Cited

U.S. PATENT DOCUMENTS

| 3,124,017 | 3/1964 | Brainard et al. | 408/46 |
| 3,652,175 | 3/1972 | Walters et al. | 408/46 |
| 3,749,507 | 7/1973 | Haley | 408/46 |
| 3,849,018 | 11/1974 | Anderson | 408/46 |

FOREIGN PATENT DOCUMENTS 968362  9/1964  United Kingdom ...................... 408/42

Primary Examiner—Leonidas Vlachos
Attorney, Agent, or Firm—C. Bruce Hamburg

[57] ABSTRACT

A multiple spindle drilling machine comprising a drilling device attached to a movable attachment stand to drill a web of a wide flange beam, the drilling device including a plurality of drills aligned in the lateral direction of the web, and a shifting device for swinging and shifting the movable attachment stand from a point on a line rectangularly intersecting a flange of the wide flange beam to the point on a line obliquely intersecting the flange of the wide flange beam with one end of the movable attachment stand being as the center.

9 Claims, 9 Drawing Figures

MULTIPLE SPINDLE DRILLING MACHINE FOR WIDE FLANGE BEAMS

BACKGROUND OF THE INVENTION

The present invention relates to a multiple spindle drilling machine for wide flange beams.

In general, both the ends of a web of a wide flange beam are in directions rectangularly intersecting flanges of the beam, and drilling of the web is ordinarily conducted on a line parallel to the edge of the web, namely on a line rectangularly intersecting the flange.

However, some wide flange beams to be used for a structure having an inclined gable board 111 having a gradient of 3/10 or 1.5 as shown in FIG. 1 have one end cut obliquely. Also on such oblique web, drilling must be performed on a line parallel to the edge thereof. Accordingly, in this case, it is necessary that drilling positions should be arranged on a line obliquely intersecting the flange.

OBJECTS OF THE INVENTION

It is a primary object of the present invention to provide a multiple spindle drilling machine for wide flange beams which can drill a web of a wide flange beam not only along a line rectangularly intersecting a flange of the beam but also along a line obliquely intersecting the flange.

Another object of the present invention is to provide a multiple spindle drilling machine for wide flange beams in which positions for drilling a web of a wide flange beam can easily be adjusted according to the width of the web.

Still another object of the present invention is to provide a multiple spindle drilling machine for wide flange beams in which drills can be swung and shifted by shifting means having a simple structure.

Other objects of the present invention will be apparent from embodiments illustrated hereinafter and be clearly set forth in the appended claims, and various advantages not specifically mentioned in the specification will be apparent to those skilled in the art when the present invention is used.

DETAILED DESCRIPTION OF THE PREFERRED EMBODIMENTS

The present invention will now be described in detail by reference to embodiments illustrated in the accompanying drawings.

Figure 1:
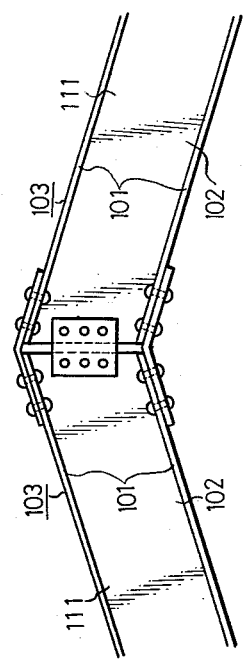
FIG. 1 is a partial front view illustrating the use of a wide flange beam as an oblique gable board.
Figure 2:
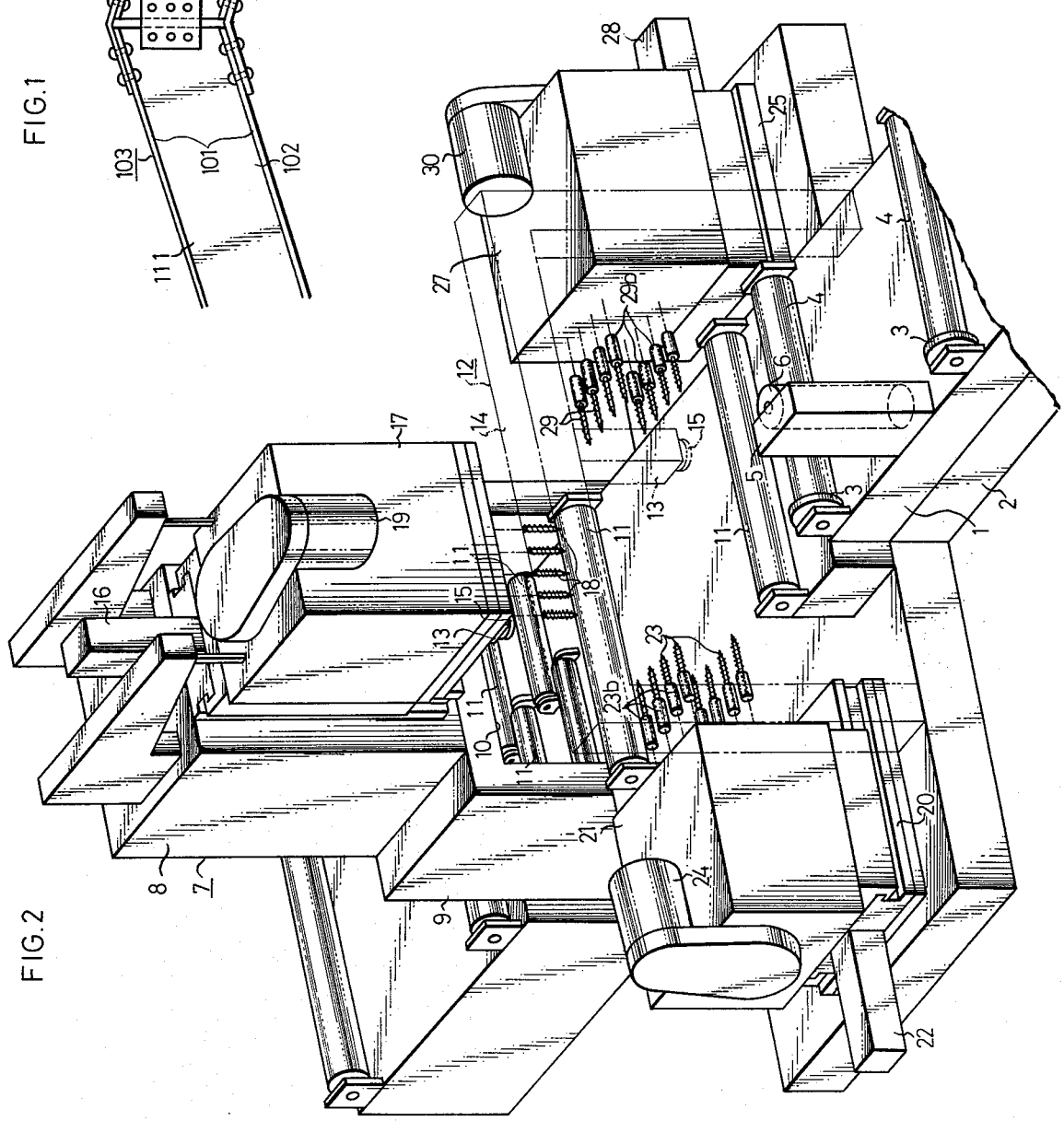
FIG. 2 is a partially cut-out perspective view showing an embodiment of the multiple spindle drilling machine for wide flange beams according to the present invention.
Figure 3:
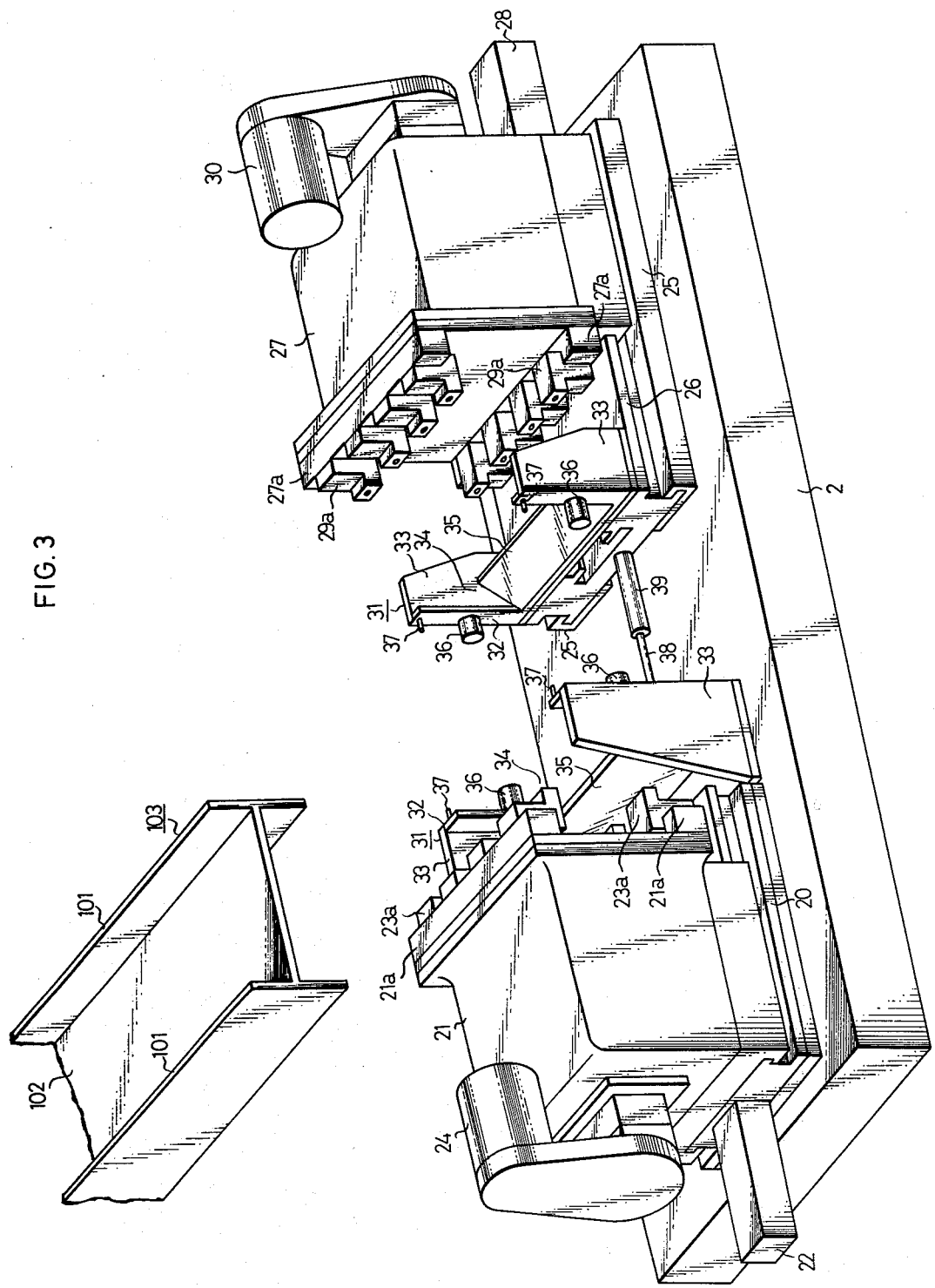
FIG. 3 is a partial perspective view showing the supporting of both left and right gear boxes on a bed of the multiple spindle drilling machine for wide flange beams.

Referring to FIG. 2, a machine stand 1 is mounted on a bed 2 and a plurality of delivery rollers 4, each having a guiding bulged portion 3 projected from the left end of the periphery, are disposed on the top face of the machine stand 1 so that they can be positively rotated, and by means of these rollers 4, a wide flange beam 103 comprising a pair of parallel flanges 101 and a web 102 connecting the flanges 101 at the centers thereof as shown in FIG. 3 are supported in the horizontal state so that the beam 103 can be delivered in the horizontal direction. An attachment frame 5 is vertically disposed on the left side of the machine stand 1 so that it can be moved to the left and right, and a guide roller 6 is vertically mounted on the attachment frame 5 freely rotatably so that the beam 103 on the delivery rollers 4 can be guided in the front-rear direction.

A supporting frame 7 including an upper frame portion 8 and a lower frame portion 9 is vertically disposed on the top face of the rear end portion of the bed 2. A passage hole 10 allowing passage of the wide flange beam 103 is formed to pierce the lower frame portion 9 in the front-rear direction, and a plurality of supporting rollers 11 are freely rotatably attached to the bottom face of said passage hole 10 at the same height as that of the supporting rollers 4. Portions of the supporting rollers 11 corresponding to drills 18 on the lower face of a vertical gear box 17 described hereinafter are omitted.

A gate-like attachment frame 12 is mounted on the front portion of the bed 2 to straddle the machine stand 1, and a pair of hydraulic cylinders 13 attached to the lower face of a lateral frame portion 14 of the attachment frame 12 and the lower frame portion 9 of the supporting frame 7, respectively, so that their positions can be adjusted in the left-right direction. A pressing member 15 is attached to the top end of the rod of each cylinder 13 to press and fix the central part of the top face of the web 102 of the wide flange beam 103.

A hydraulic cylinder 16 is attached to the upper portion of the front face of the upper frame portion 8 of the supporting frame 7 to vertically move the vertical gear box 17 mounted on the front face of the upper frame portion 8 of the supporting frame 7. A plurality of drills 18 aligned in the lateral direction are dismountably attached to the lower face of the rear portion of the gear box 17. The positions of these drills 18 can be adjusted in both the left-right and front-rear directions by a drill position adjusting device described hereinafter. Further, these drills 18 are arranged so that they are simultaneously driven and rotated through the gear box 17 by a motor 19 fixed to the front face of the vertical gear box 17.

A guide member 20 extending in the left-right direction is attached to the upper left side of the bed 2 at a position corresponding to the position of the vertical gear box 17 attached to the upper frame portion 8, and a left gear box 21 is mounted on the guide member 20 and it can be moved to the left and right along the guide member 20 by the rod of a hydraulic cylinder 22 fixed to the left end of the guide member 20. A plurality of drills 23 arranged in upper and lower two rows are mounted on the right side face of the gear box 21 so that their positions can be adjusted in both the vertical direction and the front-rear direction through a movable member 21a, a holding member 23a and a drill-fitting spindle 23b and they are simultaneously driven and rotated by a motor 24 fixed to the top face of the left gear box 21.

A pair of guide rails 25 extending in the left-right direction as well as the guide member 20 of the left gear box 21 are mounted on the upper right side of the bed 2 at a position corresponding to the position of the guide member 20 and each guide rail 25 supports thereon a slide member 26 having the same shape as that of the guide member 20 so that the slide member 26 can slide to the left and right. A right gear box 27 is mounted on the slide member so that it can be slid to the left and right with respect to the slide member 26 by the rod of a hydraulic cylinder 28 fixed to the right end of the slide member 26. A plurality of drills 29 arranged in upper and lower two rows are mounted on the left side face of the right gear box 27 so that their positions can be adjusted in both the vertical direction and the front-rear direction in correspondence to the above-mentioned drills 23 through a movable member 27a, a holding member 29a and a drill-fitting spindle 29b. These drills 29 are simultaneously driven and rotated by a motor 30 fixed to the top face of the right gear box 27.

Figure 4:
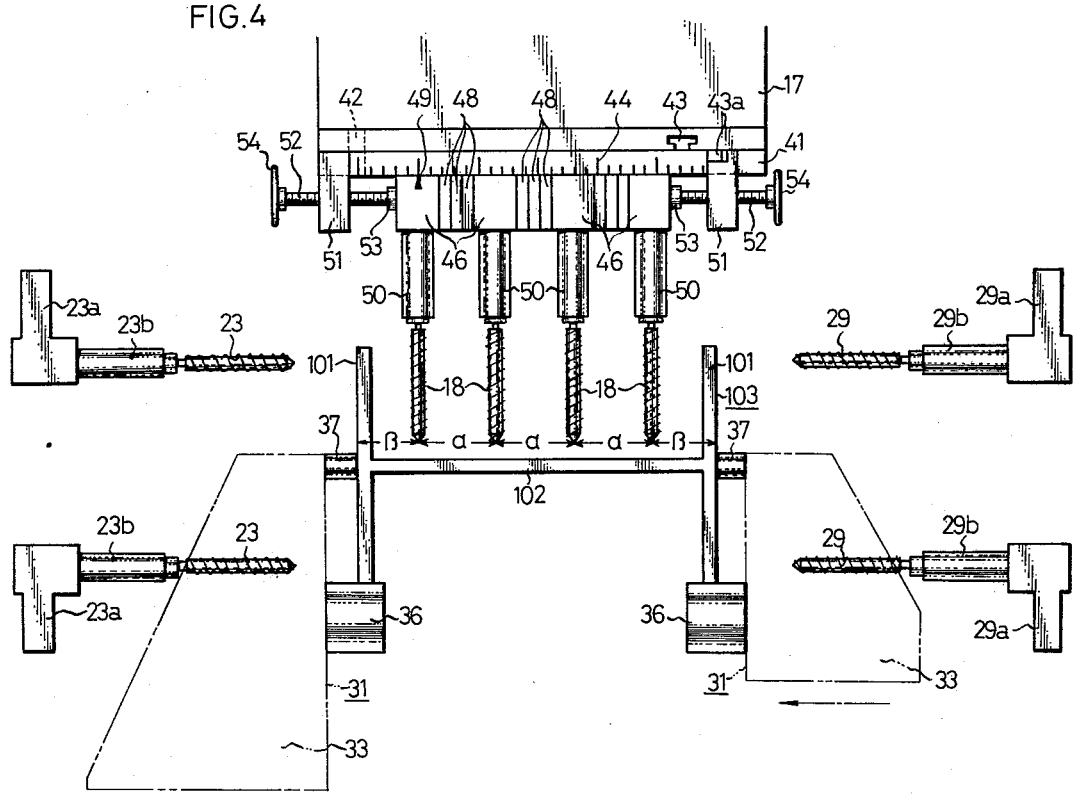
FIG. 4 is an enlarged front view showing the main part of the multiple spindle drilling machine according to the present invention.
Figure 6:
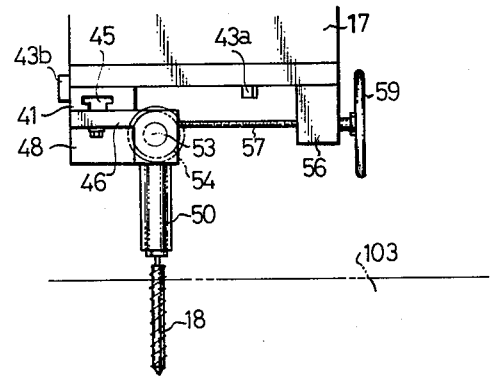
FIG. 6 is a side view showing the main part of the drilling machine of FIG. 4.

As shown in FIG. 3, a pair of gripping members 31 are vertically fixed on the top face of the bed 2 on the right side of the guide member 20 and on the top face of the left end of the slide member 26 so that they correspond to each other, and each gripping member 31 comprises a pair of front and rear side plates 33 and an attachment plate 32 connecting these side plates 33 to each other. A large notch 34 is formed in the upper portion in the attachment plate 32 while leaving both the front and rear ends thereof as they are. Right and left lowering plates 35 for lowering drilling dusts are disposed on the lower portions of the notches 34 of the attachment plates 32, respectively. The distance between the pair of the side plates 33 of each gripping member 31 is slightly larger than the width between the frontmost and rearmost drills 23 on the right side face of the left gear box 21 and the distance between the frontmost and rearmost drills 29 on the left side of the right gear box 27, and the positions of the top ends of the dropping plates 35 are slightly lower than the positions of the drills 23 and 29 in the lower rows. As shown in FIGS. 3 and 4, cantilever supporting rollers 36 are freely rotatably mounted on the right side face and left side face of the attachment plates 32 located on both the front and rear sides of each notch 34, respectively, and the attachment positions of these supporting rollers are at the same height as the above-mentioned delivery rollers 4 and supporting rollers 11 on the machine stand 1. A pressing projection 37 is disposed above each supporting roller 36 on the right or left side of the attachment plate 32 so that the vertical position thereof can be adjusted infinitely.

The base end of a screw lever 38 is rotatably supported on the bed 2 in the left gripping member 31 and the top end of the screw lever 38 is projected to the right and screwed into a nut (not shown) fixed in the interior of the slide member 26. This screw lever 38 is driven and rotated through a torque limiter (not shown) by a motor (not shown). Accordingly, when the screw lever 38 is rotated and screwed into the nut, the slide members 26 are moved to the left together with the gripping members 31 and supporting rollers 36, and the wide flange beam 103 is fixed and gripped between both the left and right pressing projections 37. A protecting pipe 39 is capped on the screw portion of the screw lever 38 for protecting it from drilling dusts.

The operation of drilling the flanges 101 and web 102 of the wide flange beam 103 by the multiple spindle drilling machine having the above structure will now be described.

The vertical positions of the pressing projections of the respective gripping members 31 are adjusted according to the height of the flanges 101 of a wide flange beam 103, and the positions of the right supporting rollers 36 are adjusted in the left-right direction according to the width of the beam 103 (the length between both the flanges 101) so that a space slightly larger than the width of the beam 103 is formed. The adjustment of the positions of the supporting rollers 36 is accomplished by rotating the screw lever 38 and moving the slide member 26 to the left or right together with the right gripping member 31 along the guide rail 25. Then, the wide flange beam 103 is placed on the supporting rollers 11 and 36 and delivery rollers 4, and the screw lever 38 is turned and screwed into the nut of the slide member 26, whereby the supporting rollers 36 attached to the slide member 26 through the gripping members 31 are shifted to the left and the beam 103 is fixed and gripped between the pressing projections 37 in the space between both the gripping members 31.

At this point, also the right gear box 27 is moved to the left together with the slide member 26. When the right supporting rollers 36 are moved to the left, both the flanges 101 of the beam 103 are caused to slide on the supporting rollers 36.

Then, the hydraulic cylinders 13 attached to the attachment frame 12 and lower frame portion 9 are operated to press the web 102 of the beam 103 downwardly by the pressing members 15 of the cylinders 13 to completely fix the beam 103 on the delivery rollers 4 and other rollers. Finally, the hydraulic cylinder 22 attached to the guide member 20, the hydraulic cylinder 28 attached to the slide member 26 and the hydraulic cylinder 16 attached to the upper frame 8 are operated to move the left gear box 21 on the bed 2 to the right along the guide member 20 and move the right gear box 27 to the left along the slide member 26, whereby both the flanges 101 of the beam 103 are drilled by the drills 23 and 29. Then, the above vertical gear box 17 is brought down to drill the web 102 of the beam 103 by the drills 18.

As this point, even if the web 102 is cut obliquely, drilling of the web 102 of the beam 103 by the drills 18 must be conducted on the line parallel to the end of the web 102 as in the case where the web 102 is cut in a direction intersecting rectangularly to the flanges 101. Therefore, in such case, the drills 18 must be swung and shifted from positions on a line rectangularly intersecting the flanges 101 of the beam 103 to positions on a line obliquely intersecting the flanges 101 of the beam 103. The drill position adjusting device for making this adjustment of the positions of the drills 18 will now be described by reference to FIGS. 4 and 5.

A movable attachment stand 41 is mounted on the lower face of the vertical gear box 17 so that it can be swung and shifted forwardly with a pin 42 mounted on the top end thereof being the center. This movable attachment stand 41 is arranged so that it is moved along an arcurate groove 43 having a T-shaped section and formed with the pin 42 being the center of the arcuate configuration on the right side of the lower face of the vertical gear box 17. After this movement, the top end of the stand 41 is fixed at a predetermined position by a pair of clamping bolts 41a screwed in the T groove 43 from below. A rear stopper 43b is fixed to the rear end of the T groove to regulate the backward movement of the movable attachment stand 41. In the state where the movable attachment stand 41 bears against the rear stopper 43b, the attachment stand 41 is located on a line rectangularly intersecting the flanges 101 of the beam 103. A front stopper 43a is disposed midway in the T groove 43 so that its position can be adjusted in the front-rear direction, and it regulates the forward movement of the movable attachment stand 41. As shown in FIG. 4, graduations 44 are formed on the front face of the movable attachment stand 41 substantially entirely along its length in the left-right direction.

A groove 45 having a T-shaped section is formed on the lower face of the movable attachment stand 41 substantially entirely along its length in the left-right direction, and a plurality of nuts (not shown) are disposed in the interior of the T groove 45 so that they can be moved in the left-right direction. A plurality of spindle holding members 46 are disposed equidistantly on the lower face of the movable attachment stand 41 so that when the top ends of bolts 47 piercing the holding members 46 from below are screwed in the nuts disposed in the T groove 45, the positions of the holding members 46 can be adjusted in the left-right direction with respect to the movable attachment stand 41. As shown in FIG. 4, a plurality of pitch liners 48 are disposed between every two adjacent spindle holding members 46 so that the distance between the two adjacent holding members 46 can optionally be adjusted. A positioning arrow mark 49 is formed on the front face of the leftmost spindle holding member 46 and it corresponds to the graduations 44 formed on the front face of the movable attachment stand 41. A drill-fitting spindle 50 is mounted on the lower face of each spindle holding member 46 and a drill 18 for drilling the web 102 of the wide flange beam 103 is dismountably attached to each spindle 50. The drills 18 are arranged equidistantly in a line in the lateral direction. The distance between the leftmost drill 18 and the left flange 101 of the beam 103 is made equal to the distance between the rightmost drill 18 and the right flange 101 of the beam 103.

A hole 61 is formed on the vertical gear box 17 and a driving mechanism for driving and rotating the drills 18 is installed in this hole 61 so that the driving mechanism may be moved in the front-rear direction to some extent.

A pair of right and left supporting members 51 project from the opposite ends of the movable attachment stand 41 to the front of the lower portion. The supporting members 51 correspond to the front of the spindle supporting members 46. A pair of screw levers 52 are screwed into and through respective supporting members 51 from the left and right sides respectively. The screw lever 52 cause doubling plates 53 to abut upon the right and left end spindle supporting members 46. Handles 54 are mounted on the outer ends of respective screw levers 52.

As shown in FIG. 5, a connecting member 55 is projected from the right side of the movable attachment stand 41 and a supporting projection 56 corresponding to this connecting member 55 is mounted on the right side of the front portion of the vertical gear box 17. The front end portion of a screw lever 57 is rotatably supported by the supporting projection 56 through a bearing 58 and the screw lever 57 extends in the front-rear direction. The rear end of the screw lever 57 is screwed in the connecting member 55 of the movable attachment stand 41 through a spherical bearing (not shown). A handle 59 is mounted on the front end of the screw lever 57. The portion of the screw lever 57 screwed into the connecting member 55 is arranged so that when the connecting member 55 is turned, it is allowed to move to the left and right to some extent.

Figure 7A:
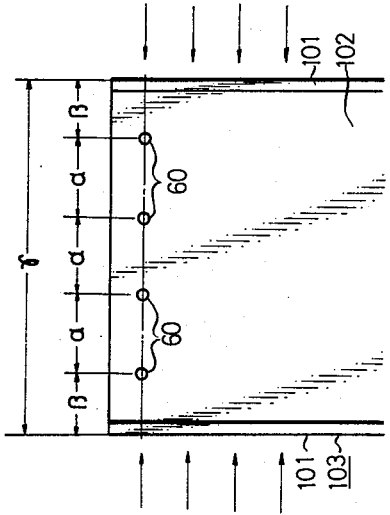
FIGS. 7(a) and 7(b) are plan views showing parts of wide flange beams drilled by the multiple spindle drilling machine according to the present invention.
Figure 5A:
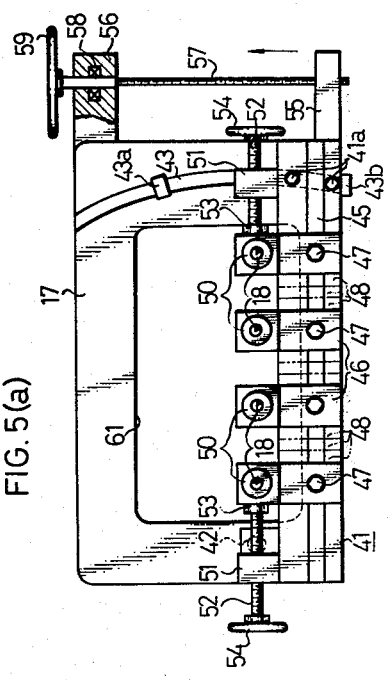
FIG. 5(a) is a bottom view showing the drilling machine of FIG. 4.

The operation of drilling a web 102 of a wide flange beam 103 having the web 102 cut in a direction rectangularly intersecting flanges 101 as shown in FIG. 7(a) by using the drill position adjusting device having the above-mentioned structure will now be described. As shown in FIG. 5(a), the movable attachment stand 41 is swung and shifted along the T groove 43 to the rearmost position with the pin 42 being as the center. At this point, the backward movement of the movable attachment stand 41 is regulated by the rear stopper 43b mounted on the T groove 43. In this state, the wide flange beam 103 is moved forward or backward so that drills 18 are located just above portions to be bored, and the vertical gear box 17 is then lowered.

Thus, by the drills 18, as shown in FIG. 7(a), a plurality of holes 60 is formed in the web 102 of the beam 103 on a line rectangularly intersecting the flanges 101 and parallel to the edge of the web 102. Accordingly, if at this point the drills 23 and 29 located on both the left and right sides of the beam 103 are moved to the right and left, respectively, both the web 102 and the flanges 101 of the beam 103 can be drilled simultaneously.

Figure 7B:
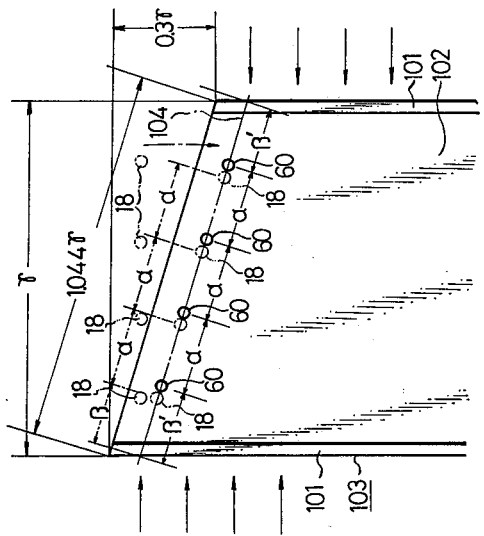
Figure 5B:
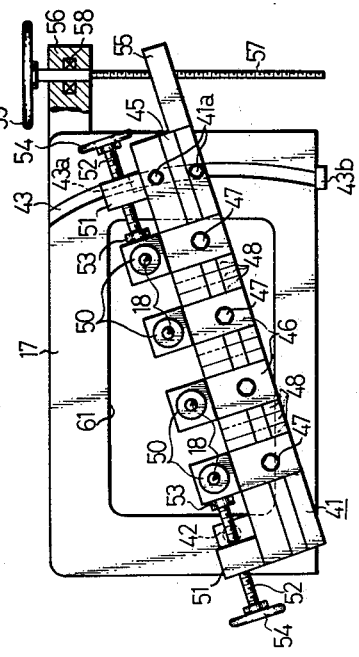
FIG. 5(b) is a bottom view illustrating a movable attachment stand shifted in the drilling machine shown in FIG. 4.

When a wide flange beam 103 having the edge of a web 102 cut obliquely as shown in FIG. 7(b) is drilled on the web 102, the clamping bolts 41a on the lower face of the movable attachment stand 41 are loosened and the position of the front stopper 43a of the T groove 43 is adjusted so that when the movable attachment stand 41 is swung forward and shifted until the front stopper 43a of the T groove 43 bears against the movable attachment stand 41, the drills 18 will be located on a line parallel to the oblique edge of the web 102. Then, as shown in FIG. 5(b), the movable attachment stand 41 is swung forward and shifted with the pin 42 being as the center until the right end of the attachment stand 41 bears against the front stopper 43a. This swinging movement is accomplished by turning the handle 59 mounted on the front portion of the supporting projection 56 in a direction of screwing the screw lever 57 into the connecting member 55 on the right side of the movable attachment stand 41. More specifically, when the handle 59 is thus turned, the screw lever 57 is screwed into the connecting member 55 and hence, the movable attachment stand 41 is swung forward and moved with the pin 42 being as the center. When the movable attachment stand 41 is thus shifted, the drills 18 are arranged in a line parallel to the edge of the web 102 of the beam 103. Then, the clamping bolts 41a are fastened.

After the movable attachment stand 41 has thus been shifted, the spindle holding members 46 are moved slightly to the right along the T groove 45 while keeping the distance between every two adjacent spindles 46 constant, so that the distance between the leftmost drill 18 and the left flange 101 of the beam 103 is made equal to the distance between the rightmost drill 18 and the right flange 101 of the beam 103.

This rightward movement of the spindle holding members 46 is accomplished by loosening the bolts 47 of the respective spindle holding members 46, turning the right handle 54 of the movable attachment stand 41 in a direction of retracting the screw lever 52 from the supporting member 51 and turning the left handle 54 of the movable attachment stand 41 in the reverse direction, namely the direction of screwing the screw lever 52 into the supporting member 51. By this operation of the handle 54, the left screw 52 is screwed into the supporting member 51 and the respective spindle holding members 46 are moved to the right along the T groove 45 of the movable attachment stand 41 together with the pitch liners 48 through a doubling plate 53 of the screw lever 52. At this point, the magnitude of the movement of the spindle holding members 46 on the movable attachment stand 41 can be read from the arrow mark 49 formed on the leftmost spindle holding member 46 and the graduations 44 formed on the front face of the movable attachment stand 41.

After completion of the movement of the spindle holding members 46, the right handle 54 of the movable attachment stand 41 is turned in a direction of screwing the screw lever 52 into the holding member 51 so that the doubling plate 53 bears against the rightmost spindle holding member 46, whereby the respective holding members 46 are gripped and fixed between a pair of the doubling plates 53. Finally, the bolts 47 of the respective holding members 46 are fastened to fix the holding members 46 tightly to the movable attachment stand 41.

The magnitude of the movement of the spindle holding member 46 after the swinging movement of the above-mentioned movable attachment stand 41 will now be described.

As shown in FIG. 4, when the web 102 of the wide flange beam 103 is drilled on a line rectangularly intersecting the flanges 101 of the beam 103, suppose that the distance between the centers of all adjacent drills 18 is set as $\alpha$ and the distance between the center of the leftmost or rightmost drill 18 and the outside of the left or right flange 101 of the beam 103 is set as $\beta$, the distance between the centers of all adjacent drill holes 60 formed on the beam 103 is $\alpha$ and the distance between the leftmost or rightmost hole 60 and the outside of the left or right flange 101 is $\beta$ (see FIG. 7(a)). Accordingly, when the drills 18 are swung forward and moved as indicated by a two-dot chain line in FIG. 7(b) and they are located on a line 104 parallel to the edge of the obliquely cut web 102, the distance between the centers of every two adjacent drills 18 is $\alpha$ on the line 104 and the distance between the center of the leftmost drill 18 and the outside of the left flange 101 is $\beta$.

When the drills 18 are shifted to the right on the line 104 and drill holes 60 are formed in the web 102, the distance between every two adjacent holes 60 is $\alpha$ and the distance between the leftmost drill hole 60 on the line 104 and the outside of the left flange 101 is made equal to the distance between the rightmost drill hole 60 and the outside of the right flange 101. Accordingly, suppose that the distance between the leftmost drill hole 60 and the outside of the left flange 101 is $\beta'$, the magnitude of the movement of the drills 18, namely the spindle holding members 46, is $(\beta' - \beta)$.

Suppose that the gradient of the web 102 is 3/10 and the width between the outside of both the flanges 101 on the line rectangularly intersecting the flanges is $\gamma$, the length between the outer faces of the flanges 101 is about $1.044\gamma$. Therefore, the value of $\beta'$ is expressed as follows:

$$\beta' = (1.044\gamma - 3\alpha)/2$$

Further, as is seen from FIG. 7(a), the value of $\beta$ is expressed as follows:

$$\beta = (\gamma - 3\alpha)/2$$

Therefore, the value of $(\beta' - \beta)$ is expressed as follows;

$$\beta' - \beta = 1.044\gamma - 3\alpha - (\gamma - 3\alpha)/2$$
$$= 0.044\gamma/2$$
$$= 0.022\gamma$$

Namely, when the gradient of the web 102 is 3/10, the magnitude of the movement of the spindle holding members 46 after the swinging movement of the movable attachment stand 41 is a value obtained by multiplying the width $\gamma$ between the outsides of the flanges 101 of the beam 103 by 0.022.

In the above-mentioned wide flange beam 103 having a gradient of 3/10, since the position of the ends of both the left and right flanges 101 deviate in the front-rear direction by a length of $0.3\gamma$, when also the flanges 101 are drilled, one flange 101 is first drilled simultaneously with drilling of the web 102 and the beam 103 is moved forward or backward by a length of $0.3\gamma$ and the other flange 101 is drilled.

As will be apparent from the foregoing illustration, when the multiple spindle drilling machine of the present invention is used, drilling of a web 102 of a wide flange beam 103 can easily be performed not only on a line rectangularly intersecting flanges 101 but also on a line obliquely intersecting the flanges 101.

In the foregoing embodiment, the movable attachment stand 41 to which drills 18 are attached is arranged so that it can be swung forward and moved with the left end thereof being as the center, but in the present invention, the movable attachment stand 41 may be arranged so that it is swung and moved with the right end thereof being as the center or it may be swung backward and moved. Further, in order to allow the connecting member 55 to move to the left and right to some extent during the swinging movement of the movable attachment stand 41, the screw lever 57 may be arranged so that it is rotated on the left and right in the portion engaging with the supporting projection 56 of the vertical gear box 17. Still further, a link mechanism may be used as the mechanism for moving the movable attachment stand 41 instead of the above-mentioned screw lever 57.

The present invention has been described in detail by reference to the most preferred embodiment, but as will be apparent to those skilled in the art, various changes and modifications can be made without departing from the spirit and scope of the invention as defined in the appended claims.

What is claimed is:

1. A multiple spindle drilling machine comprising drilling means attached to a movable attachment stand to drill a web of a wide flange beam, said drilling means including a plurality of drills aligned in the lateral direction of the web, spindles for supporting the respective drills and spindle holding members for supporting the respective spindles, gripping means disposed to grip all the spindle holding members from both the outer sides and fix them onto the movable attachment stand so that they cannot be moved, and shifting means for swinging and shifting the movable attachment stand from the point on a line intersecting rectangularly a flange of the wide flange beam to the point on a line intersecting obliquely the flange of the wide flange beam with one end of the movable attachment stand being the center.

2. A multiple spindle drilling machine as set forth in claim 1 wherein the drilling means includes drills downwardly directed above the wide flange beam.

3. A multiple spindle drilling machine as set forth in claim 1 wherein said movable attachment stand is attached to a vertical gear box having a drill rotating mechanism installed therein and in the drilling operation, all the drills are simultaneously driven and rotated by said rotating mechanism.

4. A multiple spindle drilling machine as set forth in claim 1 wherein said drilling means includes at least one movable attachment stand to which said spindle holding members are attached.

5. A multiple spindle drilling machine as set forth in claim 4 wherein said spindle holding members are attached to the movable stand so that they can move to approach to or separate from each other and the positions of said spindle holding members are adjusted according to the width of the web of the wide flange beam.

6. A multiple spindle drilling machine as set forth in claim 4 wherein pitch liners for adjusting the drill distance are interposed between every two adjacent spindle holding members.

7. A multiple spindle drilling machine as set forth in claim 1 wherein said gripping means includes a pair of supporting members fixed to both the ends of the movable attachment stand, a pair of screw levers screwed into the outer sides of the supporting member, a pair of doubling plates attached to the inner ends of said screw levers to bear against the spindle holding members located on both the side end portion, respectively, and handles attached to the outer ends of the respective screw levers.

8. A multiple spindle drilling machine comprising drilling means attached to a movable attachment stand to drill a web of a wide flange beam, said drilling means including a plurality of drills aligned in the lateral direction of the web, and shifting means for swinging and shifting the movable attachment stand from the point on a line intersecting rectangularly a flange of the wide flange beam to the point on a line intersecting obliquely the flange of the wide flange beam with one end of the movable attachment stand being the center, the movable attachment stand being attached to the rear portion of a vertical gear box having a drill rotating mechanism installed therein so that the movable attachment stand is forwardly swung and moved by said shifting means.

9. A multiple spindle drilling machine as set forth in claim 8 wherein said shifting means includes a connecting member projected from one end of said movable attachment stand, a supporting projection mounted in the front portion of the vertical gear box to correspond to said connecting member, a screw lever rotatably supported by said supporting projection and having the rear end screwed in the connecting member, and a handle attached to the front end portion of said screw lever.

* * * * *